US007225254B1

(12) United States Patent
Swildens et al.

(10) Patent No.: US 7,225,254 B1
(45) Date of Patent: May 29, 2007

(54) PERFORMANCE COMPUTER NETWORK METHOD

(75) Inventors: Eric Sven-Johan Swildens, Mountain View, CA (US); Ajit K. Gupta, Fremont, CA (US); Richard David Day, Upton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 199 days.

(21) Appl. No.: 10/774,246

(22) Filed: Feb. 6, 2004

Related U.S. Application Data

(63) Continuation of application No. 09/645,067, filed on Aug. 23, 2000, now Pat. No. 6,694,358.

(60) Provisional application No. 60/166,906, filed on Nov. 22, 1999.

(51) Int. Cl.
G06F 15/13 (2006.01)

(52) U.S. Cl. .................. 709/224; 709/203; 709/225

(58) Field of Classification Search ........ 709/224, 709/203, 225
See application file for complete search history.

(56) References Cited

U.S. PATENT DOCUMENTS

| 5,459,837 | A | 10/1995 | Caccavale |
| 5,664,106 | A | 9/1997 | Caccavale |
| 5,884,038 | A | 3/1999 | Kapoor |
| 5,935,207 | A | 8/1999 | Logue et al. |
| 6,038,601 | A | 3/2000 | Lambert et al. |
| 6,070,191 | A | 5/2000 | Narendran et al. |

(Continued)

FOREIGN PATENT DOCUMENTS

WO    WO 00/14938 A2    3/2000

Primary Examiner—Nathan J. Flynn
Assistant Examiner—Jinsong Hu
(74) Attorney, Agent, or Firm—Kirk D. Wong; Hickman Palermo Truong & Becker LLP

(57) ABSTRACT

A method for a computer network includes sending a first request from a web client for resolving a first web address of a web page to a client DNS server, sending the first request from the client DNS server to a POP DNS server within a POP server network, using a probe server in the POP server network to determine traffic loads of a plurality of customer web servers, each of the customer web servers storing the web page, using the POP DNS server to determine a customer web server from the plurality of customer web servers, the customer web server having a traffic load lower than traffic loads of other customer web servers in the plurality of customer web servers, requesting the web page from the customer web server, the web page including static content represented by an embedded URL, sending the web page from the customer web server to the web client, sending a second request from the web client for resolving the URL to the client DNS server. sending the second request from the client DNS server to the POP DNS server within a POP server network, using the probe server to determine service metrics of a plurality of web caches within the POP server network, using the POP DNS server to determine a web cache from the plurality of web caches, the web cache having service metrics more appropriate for the second request than service metrics of other web caches in the plurality of web caches, requesting the static content from the web cache, sending the static content to the web client, and outputting the static content with the web client.

40 Claims, 6 Drawing Sheets

U.S. PATENT DOCUMENTS

| | | |
|---|---|---|
| 6,092,178 A | 7/2000 | Jindal et al. |
| 6,108,703 A | 8/2000 | Leighton et al. |
| 6,115,752 A | 9/2000 | Chauhan |
| 6,122,666 A | 9/2000 | Beurket et al. |
| 6,128,279 A | 10/2000 | O'Neil et al. |
| 6,134,583 A | 10/2000 | Herriot |
| 6,154,849 A | 11/2000 | Xia |
| 6,167,427 A | 12/2000 | Rabinovich et al. |
| 6,167,438 A | 12/2000 | Yates et al. |
| 6,178,160 B1 | 1/2001 | Bolton et al. |
| 6,205,481 B1 | 3/2001 | Heddaya et al. |
| 6,260,070 B1 | 7/2001 | Shah |
| 6,282,569 B1 | 8/2001 | Wallis et al. |
| 6,304,913 B1 | 10/2001 | Rune |
| 6,330,602 B1 | 12/2001 | Law et al. |
| 6,351,775 B1 | 2/2002 | Yu |
| 6,351,776 B1 | 2/2002 | O'Brien et al. |
| 6,374,297 B1 | 4/2002 | Wolf et al. |
| 6,381,627 B1 | 4/2002 | Kwan et al. |
| 6,393,458 B1 | 5/2002 | Gigliotti et al. |
| 6,405,252 B1 | 6/2002 | Gupta et al. |
| 6,415,323 B1 * | 7/2002 | McCanne et al. ............ 709/225 |
| 6,415,335 B1 | 7/2002 | Lowery et al. |
| 6,427,170 B1 | 7/2002 | Sitaraman et al. |
| 6,427,187 B2 | 7/2002 | Malcolm |
| 6,438,652 B1 | 8/2002 | Jordan et al. |
| 6,442,165 B1 | 8/2002 | Sitaraman et al. |
| 6,487,555 B1 | 11/2002 | Bharat et al. |
| 6,535,509 B2 | 3/2003 | Amicangioli |
| 6,542,964 B1 | 4/2003 | Scharber |
| 6,553,376 B1 | 4/2003 | Lewis et al. |
| 6,560,639 B1 | 5/2003 | Dan et al. |
| 6,560,717 B1 | 5/2003 | Scott et al. |
| 6,564,193 B1 | 5/2003 | Shore et al. |
| 6,578,066 B1 | 6/2003 | Logan et al. |
| 6,606,643 B1 | 8/2003 | Emens et al. |
| 6,724,733 B1 | 4/2004 | Schuba et al. |
| 6,754,699 B2 | 6/2004 | Swildens et al. |
| 6,754,706 B1 | 6/2004 | Swildens et al. |
| 6,785,769 B1 | 8/2004 | Jacobs et al. |
| 6,795,434 B1 | 9/2004 | Kumar et al. |
| 2001/0056486 A1 * | 12/2001 | Kosaka ....................... 709/224 |

* cited by examiner

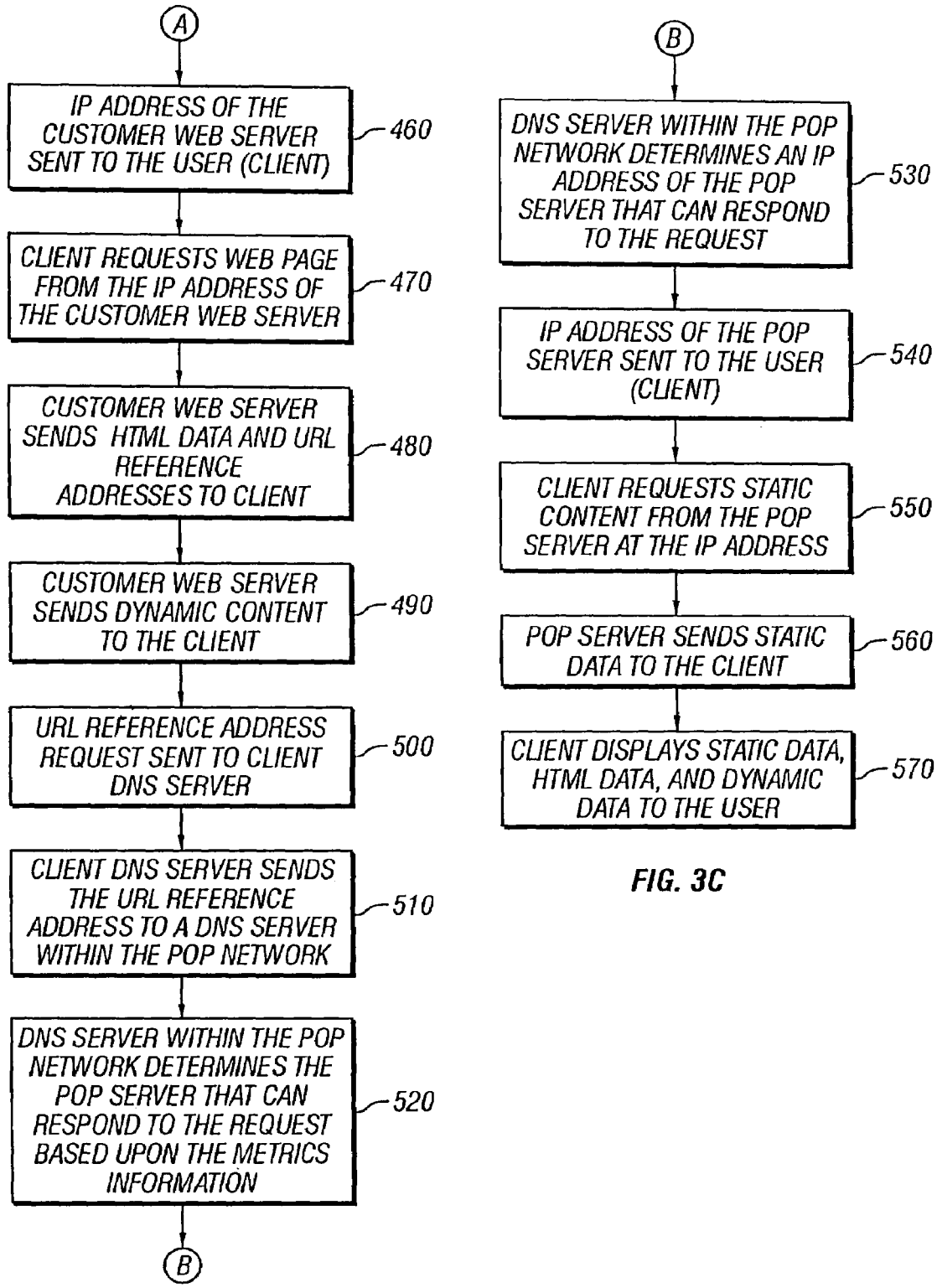

PERFORMANCE COMPUTER NETWORK METHOD

CROSS-REFERENCES TO RELATED APPLICATIONS

This application is a continuation of U.S. patent application Ser. No. 09/645,067 filed Aug. 23, 2000 now U.S. Pat. No. 6,694,358, which claims priority to Provisional U.S. Patent Application No. 60/166,906, filed Nov. 22, 1999, titled "WAN Traffic Management System and Method", the entire contents of which are incorporated herein by this reference.

BACKGROUND OF THE INVENTION

The present invention relates to world wide area networking. More particularly, the invention provides a technique including a method and system for using a global traffic management system coupled to a plurality of content servers for a service fee. But it would be recognized that the invention has a much broader range of applicability. For example, the invention can also be applied to operation on a private network, and the like.

The Internet is a world wide "super-network" which connects together millions of individual computer networks and computers. The Internet is generally not a single entity. It is an extremely diffuse and complex system over where no single entity has complete authority or control. Although the Internet is widely know for one of its ways of presenting information through the World Wide Web (herein "Web"), there are many other services currently available based upon the general Internet protocols and infrastructure.

The Web is often easy to use for people inexperienced with computers. Information on the Web often is presented on "pages" of graphics and text that contain "links" to other pages either within the same set of data files (i.e., Web site) or within data files located on other computer networks. Users often access information on the Web using a "browser" program such as one made by Netscape Communications Corporation (now America Online, Inc.) of Mountain View, Calif. or Explorer™ from Microsoft Corporation of Redmond, Wash. Browser programs can process information from Web sites and display the information using graphics, text, sound, and animation. Accordingly, the Web has become a popular medium for advertising goods and services directly to consumers.

As time progressed, usage of the Internet has exploded. There are literally millions of users on the Internet. Usage of the Internet is increasing daily and will eventually be in the billions of users. As usage increases so does traffic on the Internet. Traffic generally refers to the transfer of information from a Web site at a server computer to a user at a client computer. The traffic generally travels through the world wide network of computers using a packetized communication protocol, such as TCP/IP. Tiny packets of information travel from the server computer through the network to the client computer. Like automobiles during "rush hour" on Highway 101 in Silicon Valley, the tiny packets of information traveling through the Internet become congested. Here, traffic jams that cause a delay in the information from the server to the client occur during high usage hours on the Internet. These traffic jams lead to long wait times at the client location. Here, a user of the client computer may wait for a long time for a graphical object to load onto his/her computer.

From the above, it is seen that an improved way to transfer information over a network is highly desirable.

SUMMARY OF THE INVENTION

The present invention relates to a computer server network. More particularly, the present invention relates to an integrated load balancing and content delivery computer network.

Embodiments of the present invention include a number of Linux machines (on other operating machines) running software available from the current assignee. This software currently includes eight separate software components that are delivered as a single product. When deployed across a large number of machines, the software creates a network of point of presence (POP) computers that provides a solution for integrated content hosting and traffic management.

Customers using the POP network, according to one embodiment, can store content such as HTML, images, video, sound, software, or the like on the network for fast and highly available access by clients (end users). The network also provides load balancing and high availability for servers outside the network. Customers with generated content, such as search engines, auctions and shopping carts, can use the latter feature to add their own content servers to the network.

The computer network may be monitored using a standard web browser in some embodiments. In particular, HTML interfaces are provided that display the computer networks current status as well as historical statistics.

According to one embodiment of the invention a method for operating a network of point of presence servers sharing a hostname is disclosed. The method includes a user making a request for a web page with a domain name the POP network is authoritative for. The user's computer sends a request for name resolution of the domain name they are requesting content from to the configured local DNS server (LDNS) for that users computer. The LDNS is typically configured in close proximity to the user's computer. The LDNS resolves the IP address of the domain name the user's computer has queried for by sending a query to the Authoritative DNS server (ADNS) for that domain name.

The POP network DNS servers (SPDNS) is designated as an ADNS for all domains the POP network provides service for. On being asked to resolve the domain name from the LDNS on behalf of the user, the SPDNS first determines from the plurality of POP network servers and customer web servers the subset of servers addressable by the requested domain name. In this embodiment, addressable servers are servers that have been configured by either the customer or the POP network to satisfy user requests for content within the requested domain name. These servers have been defined in the POP network configuration as such.

From this subset of servers, the POP network selects the optimal server/servers for the user based on rules defined in the POP network configuration. These rules define how criteria such as POP/customer server health, latency from POP/customer servers to the user making the request, packet loss experienced at each POP, cost associated with each POP/customer server, and the like. These factors are then combined to define the optimal server for a given user making a request for a given domain name. In addition, persistence is defined in embodiments of the present invention for a domain name so that the user is returned to the same POP/customer server on subsequent requests within a definable time. These rules for defining the optimal server are created on a per domain name basis allowing each domain name to be configured independently. The next step includes the SPDNS returning the IP address of the optimal servers to the LDNS making the request, and the LDNS resolving the domain name for the user computer making the request for content with the IPs provided by the SPDNS.

In the present embodiment, the POP network servers are defined in the POP network configuration to be addressable by a requested domain names that represent a customer's static or cacheable content, a static domain name. The customer's servers are defined as addressable for domain names that represent dynamic or non-cacheable content, a dynamic domain name. Resolution for either domain name type is performed by the same set of servers controlled and operated by the POP network, the SPDNS. In addition, both domain name types leverage the same infrastructure for determining network and service load as well as configuration.

This technique allows the customer to organize their web site by functions where functions are mapped into domain names. The functions have requirements that define what is needed by a server to satisfy the function. Some functions may only be limited by the ability to access a collection of static content while others require a proprietary application and access to a customer's database. The domain names are then mapped into resources or servers that can be addressed by the domain name and that satisfy requests for the function that domain name has been defined to support. This method of organization allows individual elements of a web page to be retrieved from different resources. Further, such embodiments provides the SPDNS the control to direct users to an available and optimal server for a given resource. This greatly improves the user experience by reducing connection time, download time, errors, and the like.

According to one aspect of the invention, a method for a computer network is disclosed. The method includes sending a first request from a web client for resolving a first web address of a web page to a client DNS server, sending the first request from the client DNS server to a POP DNS server within a POP server network, using a probe server in the POP server network to determine traffic loads of a plurality of customer web servers, each of the customer web servers storing the web page, using the POP DNS server to determine a customer web server from the plurality of customer web servers, the customer web server having a traffic load lower than traffic loads of other customer web servers in the plurality of customer web servers.

The technique may also include requesting the web page from the customer web server, the web page including static content represented by an embedded URL, sending the web page from the customer web server to the web client, sending a second request from the web client for resolving the URL to the client DNS server, and sending the second request from the client DNS server to the POP DNS server within a POP server network. In one embodiment, the method includes using the probe server to determine service metrics of a plurality of web caches within the POP server network, using the POP DNS server to determine a web cache from the plurality of web caches, the web cache having service metrics more appropriate for the second request than service metrics of other web caches in the plurality of web caches, and requesting the static content from the web cache. Sending the static content to the web client, and outputting the static content with the web client are also contemplated.

According to another aspect of the invention, a method for a computer network is described. The method includes using a web client to enter a first web address of a web page, sending a first request from the web client to a client DNS server to resolve the first web address, sending the first request from the client DNS server to a POP DNS server within a POP server network, using a probe server in the POP server network to determine latencies between the probe server to a plurality of customer web servers, each of the customer web servers having the web page, and using the POP DNS server to determine a customer web server from the plurality of customer web servers in response to the latencies, the customer web server having a latency lower than latencies of other customer web servers in the plurality of customer web servers.

In some cases the steps of requesting the web page from the customer web server, the web page including an embedded URL representing static content, sending the web page from the customer web server to the web client, sending a second request from the web client to the client DNS server for resolving the URL, sending the second request from the client DNS server to the POP DNS server within the POP server network are also included. In the current technique using the probe server to determine loads of a plurality of web caches within the POP server network, using the POP DNS server to determine a web cache from the plurality of web caches in response to the loads, the web cache having a load lower than loads of other web caches in the plurality of web caches, retrieving the static content from the web cache, sending the static content to the web client, and utputting the static content with the web client are also included.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which:

FIGS. 3A–3C illustrate a flow chart according to an embodiment of the present invention;

DESCRIPTION OF THE SPECIFIC EMBODIMENTS

Figure 1:
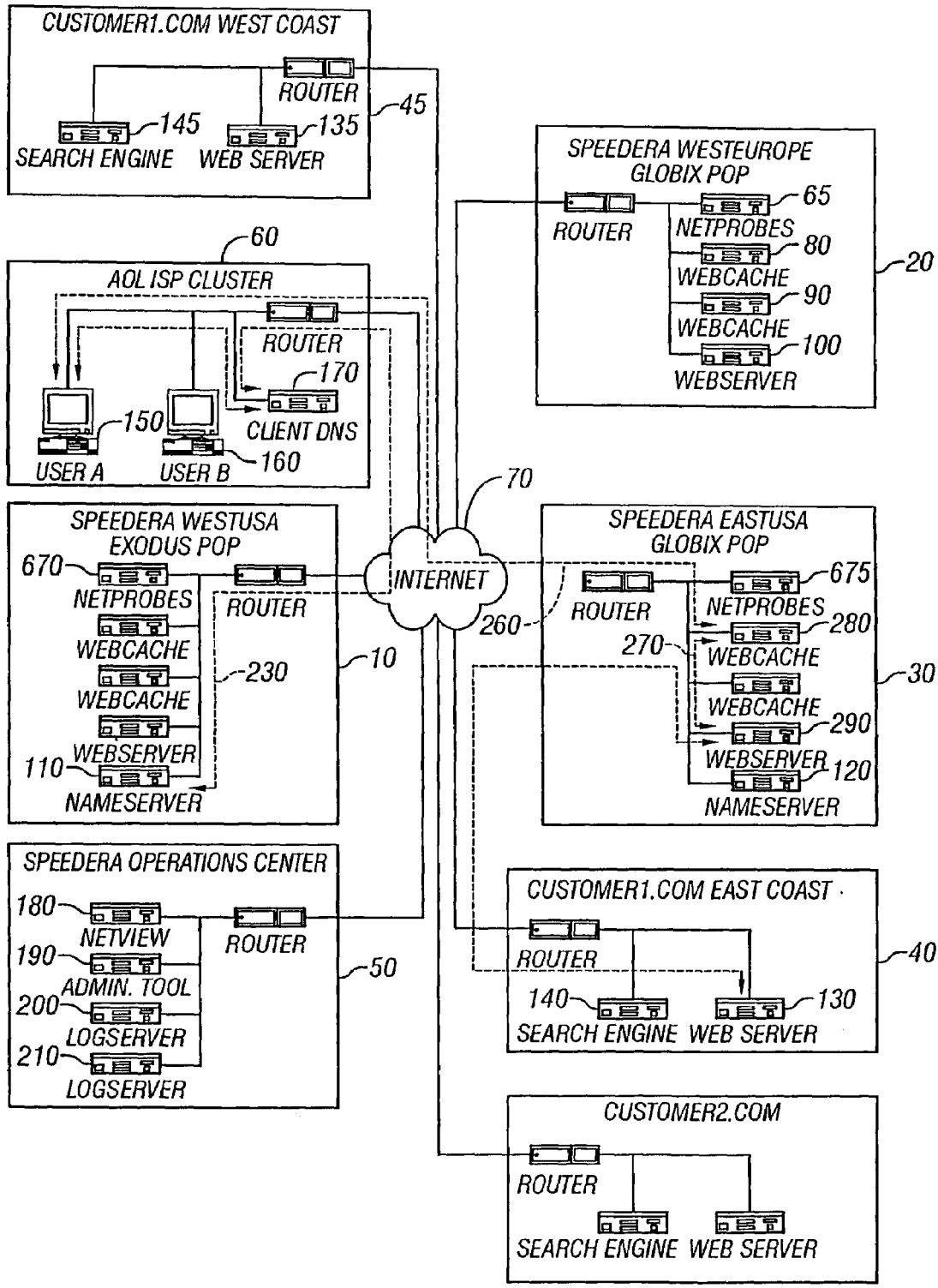
FIG. 1 is an overview block diagram of an embodiment of the present invention.

FIG. 1 is an overview block diagram of an embodiment of the present invention. The invention provides a technique including a method and system for using a global traffic management system coupled to a plurality of content servers for a service fee. FIG. 1 illustrates a series of "point of presence" (POP) servers 10, 20, and 30, customer web servers (POP servers) 40 and 45, a monitoring POP server 50, and an ISP cluster 60. In FIG. 1, the servers 10–50, and ISP 60 are typically coupled via a computer network 70, such as the Internet. In other embodiments, other types of computer networks may include other wide area networks, local area networks, such as intranets, and the like.

In the present embodiment, POP servers 10–30 are typically distributed around the world and together they form a POP network. In a typical embodiment, each POP server will include a plurality of dedicated servers, providing functionality as will be described below. For example, POP server 20 includes servers 65, 80–100. In this example, server 65 operates as a probing server according to NetProbe software described below; server 80 and 90 operate as a cache according to WebCache software described below; and server 100 operates as a content server according to WebServer software described below. As illustrated in FIG. 1, server 10 and 20 may include a server 110 and 120 that includes Domain Name Server (DNS) software, described below.

In the present embodiment, NetProbe server software performs probes across computer network 70 to determine server load and availability (metrics), to perform content checks to ensure servers are delivering correct content, to determine latency between customer web sites and POP servers, and the like. As will be described further below, NetProbe software may operate continuously and typically sends results to POP servers running NameServer software, such as POP server 10 and 30.

In embodiments of the present invention, measurements of server metrics may include response times for HTTP service, FTP service, customer web server CPU load, customer web server memory load and/or utilization, or the like. In other embodiment, other types of measurements are contemplated.

In this embodiment, the WebCache server software responds to requests for static web content from clients, such as web browsers from memory. In this example, if the requested content does not exist in server memory, the WebCache software will generate a request to a WebServer. When WebServer sends the requested content, the WebCache software caches the content in memory.

As described above, the WebServer software responds to requests for content from WebCache servers. If the content requested does not exist on disk, the WebServer software will generate a request to a web server, that is known to include the content, for example, web server 130. Once the content is provided by web server 130, the WebServer software stores the content to disk and also returns the content to the WebCache. In this embodiment, this server only gets request for WebCache "misses" so it does not require caching functionality.

In the present embodiment, DNS software performs a mapping from domain name to IP address. As an example, the DNS software is queried to resolve a hostname, or the like, and returns an IP address of a web server that has the bandwidth to respond to the request. Further, in response to a query, the DNS software returns an IP address of a web server that can quickly provide web content.

In FIG. 1, the dedicated servers are typically coupled to the computer network 70 via a router. In alternative embodiments, fewer number of physical servers may be used to implement functionality of servers 65, 80–100, or the like. For example, a physical server may have multiple software packages operating upon it at one time. As an example, WebCache software and WebServer software may operate as two different processes on a single server. Generally, each POP server will include NetProbe, WebCache, and WebServer software. In one embodiment, only a limited number of POP servers will include DNS software, however, in other embodiments, the number of servers with DNS software may be increased.

As shown in FIG. 1, customer web servers 40 and 45 typically include web servers 130 and 135 and servers 140 and 145. In this embodiment, web servers 130 and 135 provide static content, such as text and graphics, further servers 140 and 145 provide non-static content, or content that changes in response to a user query, or the like. In some embodiments, servers 140 and 145 may be search engines, databases, or the like. Typically, customer POP web servers 40 and 45 are mirrors of each other, and are designed to improve the perceived responsiveness of a web site with respect to a user.

ISP 60 is illustrated including users 150–160, and a client DNS server 170. In this embodiment, ISP 60 may be a conventional ISP such as Earthlink, AOL, or the like. Accordingly, users 150 and 160 may be home users using dial-up lines, cable modems, DSL, or the like, to connect with ISP 60. As illustrated, client DNS server 170 is typically provided within ISP 60. In the present embodiment, client DNS server 170 is typically used to resolve a host name into an IP address. If client DNS server 170 does not know the IP address, client DNS server 170 may pass the request to other DNS servers, such as DNS servers 110–120, or the like.

In the example in FIG. 1, a monitoring POP server 50 may include a plurality of dedicated servers, providing functionality described herein. For example, monitoring POP server 50 includes servers 180–210. In this example, server 180 operates as an monitoring display server according to NetView software described below; server 190 operates as an administration server according to tools, together termed AdminTool software, described below; and servers 200 and 210 operate as logging servers according to LogServer software described below. As illustrated in FIG. 1, POP server 10 and 20 may include a server 110 and 120 that includes Domain Name Server (DNS) software, described below.

In the present embodiment, NetView software provides an HTML interface to current and historical statistics for customers and network administrators. The statistics about the POP network, and the like are typically derived from servers running LogServer software, such as servers 200 and 210, described below. In this embodiment, NetView software includes web server CGI programs to provide the HTML output. The NetView software also provides an interface that allows customers to flush content from the POP network as they update the content on their web servers.

LogServer software, in this embodiment, receives log file data from servers running NameServer, WebCache, WebServer and NetProbes software, and the like. In this example, LogServer software, receives the log file data, and stores the data onto disk. Next, in response to requests for current and historical information from NetView software servers, the LogServer software separates the data into appropriate categories and processes the data to generate statistics. As mentioned above, the data is thus used for monitoring the state of POP servers on the network.

In the present embodiment, various administrator tools, termed AdminTool software are also typically provided. These tools are used by the administrator to configure and administer the network of POP servers. In one example, tools provides tools that "spider" a customer web site and load WebServers and caches with content.

In the present embodiment, a single monitoring POP server 50 is contemplated, however, multiple monitoring servers may be provided in alternative embodiments of the present invention.

In the present embodiment, POP servers 10–30, and monitoring POP server 50 includes shared software. This set of client and server software programs includes a server that receives a global configuration file that specifies the architecture of the POP servers, and stores it locally.

In the present embodiment, in a typical deployment, POP servers will include multiple machines, each with a single purpose (DNS name server, for instance). However, it should be understood that virtually any combination of the software components described above can be installed on a single machine in alternative embodiments of the present invention. Further details regarding the software components will be given below.

In the present embodiment, POP servers 10–30 and customer web server 40 and 45 work together to provide static content and dynamic content to a user, such as user 150 coupled to ISP 60. The POP network illustrated in FIG. 1 provides content hosting for static content, such as images, video, software, etc. The POP network also provides for load balancing and traffic management for services, and dynamic content, that cannot be stored. Further detail regarding the process will be described below.

In the embodiment illustrated in FIG. 1, it should be noted that the POP server network may simultaneously provide traffic management, as well as content hosting to more than one specific customer. For example, customer1 and customer2 share the POP server network. In one example, POP server network may provide traffic load management by directing traffic to either customer1 web server 40 or customer1 web server 45. At the same time, POP server network may be used to host static content for customer2. Still further POP server may provide both traffic management and content hosting, as will be illustrated and discussed below. Accordingly, the POP server network may be termed a "shared" server network.

Figure 2:
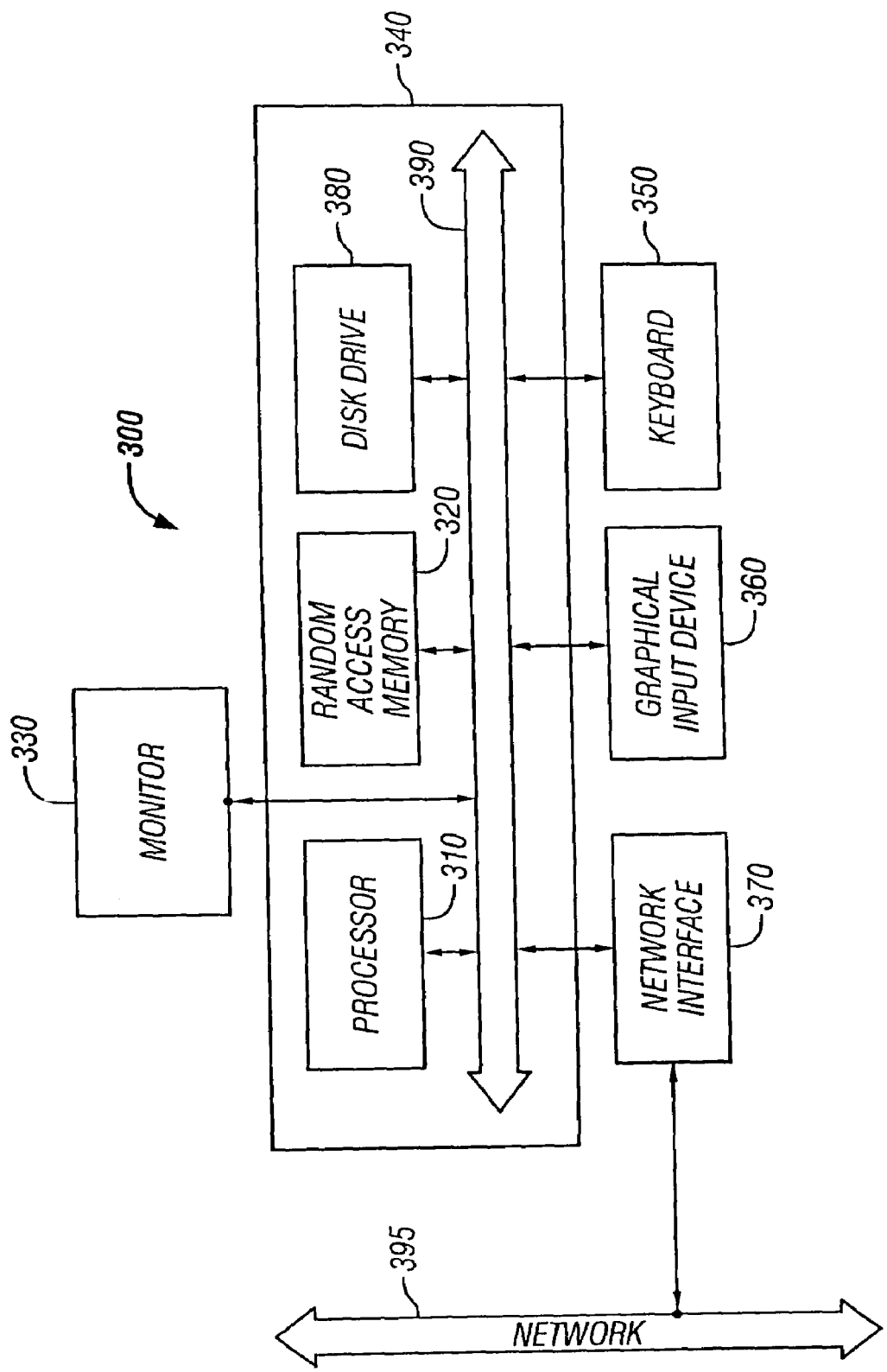
FIG. 2 illustrates a block diagram of a typical server machine according to an embodiment of the present invention.

FIG. 2 illustrates a block diagram of a typical server machine 300 according to an embodiment of the present invention. Server machine 300 typically includes a monitor 330, a computer 340, a keyboard 350, an input device 360, and a network interface 370. Computer 340 includes familiar computer components such as a processor 310, and memory storage devices, such as a random access memory (RAM) 320, a disk drive 380, and a system bus 390 interconnecting the above components. Network interface 370 is illustrated coupled to a network 395, or the like In the present embodiment, a mouse is but one example of an input device 360, also known as a pointing device. Other types of input devices may include trackballs, drawing tablets, microphones (for voice activated input), and the like. In the present embodiment, network interface 370 may be an Ethernet card, a modem, or the like.

RAM 320 and disk drive 380 are examples of tangible media for storage of data, files, log data, computer programs, drivers, embodiments of the herein described methods, and the like. Other types of tangible media include floppy disks, removable hard disks, optical storage media such as CD-ROMS and bar codes, and semiconductor memories such as flash memories, read-only-memories (ROMS), battery-backed memories, and the like.

In a preferred embodiment, Server 300 includes a PC compatible computer having '586 or '686 class based microprocessors, such as the Athlon™ microprocessor from AMD. Further, in the present embodiment, Server 300 utilizes LINUX, and runs software provided by Speedera Networks, Inc., the assignee of the present invention.

FIG. 2 is representative of but one type of system for embodying the present invention. It will be readily apparent to one of ordinary skill in the art that many types of hardware and software configurations are suitable for use in conjunction with the present invention. For example, processors such as the G4 from Motorola, PentiumIII, Pentium4, Itanium from Intel, and the like may be used; further any computer communications bus may be used in alternative embodiments of the present invention. In other embodiments, server 300 may operate under the WindowsNT operating system, may operate under MAC OS from Apple Computer, BeOS from Be, Incorporated, and the like.

Figure 3A:
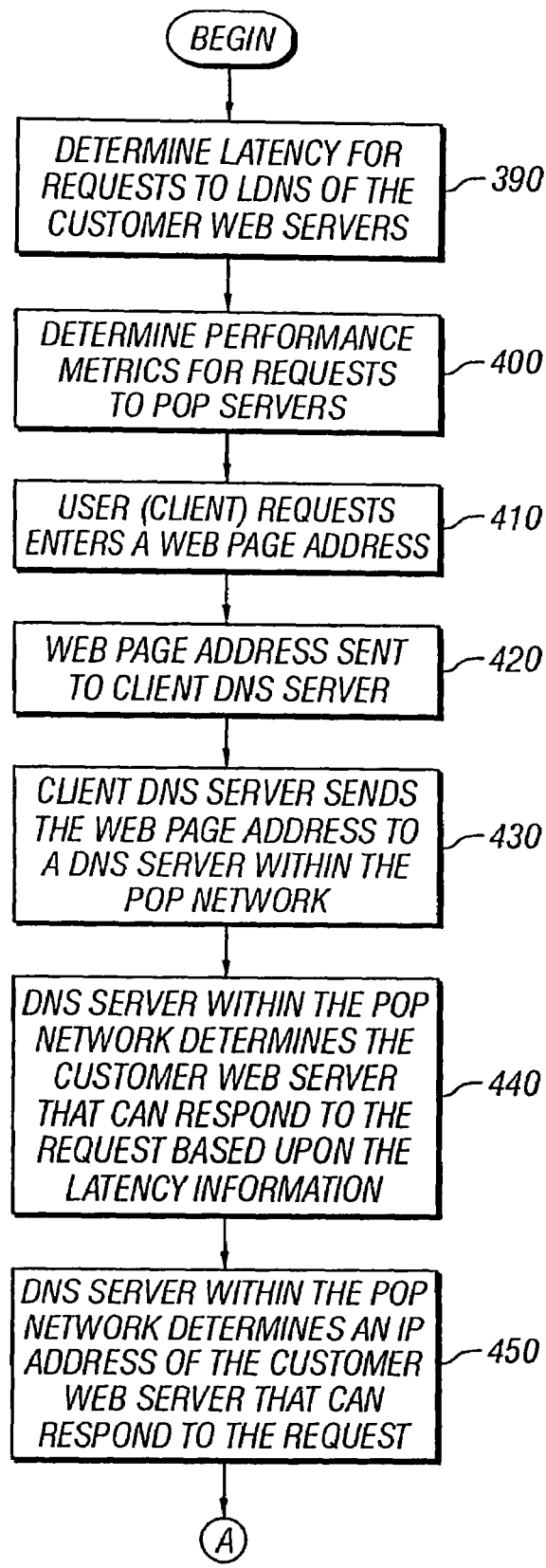

FIGS. 3A–3C illustrate a flow chart according to an embodiment of the present invention. In particular, FIGS. 3A–3C illustrate a method for a network of POP servers to service a request from a user. In the flow chart below, reference are made to the system in FIG. 1 for convenience.

Initially, NetProbe servers 670 and 675, and the like determine the amount of latency between itself and customer web server 40 and customer web server 45, step 390. Latency may also be determined between NetProbe servers 670 and 675 and the user's (client's local) DNS). Latency between a local DNS and NetProbe servers 670 and 675 are measured because the latency information should be as a user would experience it. Further, a NetProbe server should be in close proximity to the Customers' origin sites.

In the present embodiment, the latencies may include a measurement of the amount of traffic and the load on the customer web servers at that moment in time. Further, the latency may include a measurement of response times between the particular NetProbe server 670 and the different customer web servers. In embodiments of the present invention, measurements of latency may include response times for HTTP service, FTP service, streaming media service. Additionally, factors such as customer web server CPU load, customer web server memory load and/or utilization, or the like may also be considered. In other embodiments, other types of measurements are contemplated, for example performance metrics, availability, persistence data, client weighting factors, and the like.

Because NetProbe servers 670 and 675, and the like run virtually independently from other servers within a POP server, such as within POP server 10, this step may be repeated at regular intervals, for example, every hour or the like. In embodiments of the present invention, it is envisioned that some customers may have many more than two web servers, thus NetProbe servers 670 and 675 may take additional traffic load measurements.

NetProbe servers 670 and 675, and the like also determine the performance of other POP servers, such as POP server 20, 30, or the like, step 400. This type of data is termed "service metrics" of the POP network. In the present embodiment, the metrics may include a measurement of the amount of traffic and the load on a POP server at a recent period in time. In embodiments of the present invention, service metrics may also consider response times for HTTP service, FTP service, POP server CPU load, POP server memory load and/or utilization, or the like. In other embodiment, other types of measurements are contemplated, for example availability, persistence data, client weighting factors, monetary costs, and the like.

Because NetProbe servers 670 and 675, and the like run virtually independently from other servers within a POP server, such as POP server 10, this step may be repeated at regular intervals, for example, every hour or the like.

Next a user, such as user 150 enters the name of a customer's web site, step 410. In one embodiment, a user can type-in the name of a customer's web site via keyboard, and in another embodiment, the user can select a hyperlink to the customer's web site from a page the user is viewing, or the like. In the example, the customer's web site is "customer1.com."

In response to the user entry, the name of the customer's web site is passed (220) to a local client DNS (LDNS) 170, step 420. As discussed above, domain name servers typically translate textual names, or the like into IP addresses. If the LDNS does not know how to resolve the name, the DNS may route the request to another DNS. In this example, client DNS 170 passes (230) the name to an authoritative NameServer server (ANDS) 110, step 430.

In the present embodiment, NameServer server 110 typically uses the latency and traffic load information associated with the customer's web sites that was determined in step 390, to select an appropriate customer web server to return to the user, step 440. In this example, NameServer server 110 determines that the west coast customer web server 45 is very heavily loaded with requests, but the east coast customer web server 40 has light traffic. Thus, in response to the user's request, NameServer server 110 determines that the user should be directed to customer web server 40. NameServer server 110 then determines the IP address of customer web server 40, step 450, and then sends the IP address to the user, step 460.

In an alternative embodiment of the present embodiment, NameServer server 110 may use latency information from multiple NetProbe servers such as NetProbe server 670 and 675. Further, NameServer server 110 may uses this information in addition to latencies between the NameServer server and NetProbe servers 670 and 675 in step 440. As an example, NetProbe server 670 reports the latency of customer web server 45 to NameServer 110 because NetProbe server 670 may be the closest NetProbe server; further NetProbe server 675 reports the latency of customer web server 40 to NameServer 110 because NetProbe server 675 may be the closest NetProbe server. In an example, if the reported latencies are the same, NameServer 110 would resolve the domain name to customer web server 45 because the additional latency between NetProbe server 670 and NameServer 110 is smaller than the latency between NetProbe server 675 and NameServer 110. In other words, the sum of the latencies is used to determine how to resolve the IP address. In this example, user 150 receives the IP address, and then sends requests for a web page, or the like, at the received IP address, step 470. The web page request typically includes static content and dynamic content. In this example, static content may include graphics and text that typically do not change between web page accesses, for example, corporate logos, archival images, documents, and the like. In this example, dynamic content may include graphics and text that do change between web page accesses, for example, stock quotes, search results, live web cameras, and the like.

In the present example, the web page requested from customer web server 40 includes static data, such as HTML text and URL addresses of static content, such as images, and dynamic data, such as stock quotes. In FIG. 1, the static data typically resides on web server 130, and the dynamic data resides within server 140. As discussed above, this data is also typically mirrored on web server 135 and server 145 in customer web server 45.

In the present embodiment, the customer does not want web server 130 to have the burden of providing static content to many different users. In this embodiment, the POP network provides the content hosting of the static content. Accordingly, the URL addresses of the static content typically include textual domain names specifying the POP server network.

In response to the request from user 150, web server 130 sends the HTML text, or the like, and the URL address of images to user 150, step 480. Additionally, server 140 may process the request from user 150, determine the responsive data dynamically, and send the dynamic data back to user 150, step 490.

In the present embodiment, the user's 150 client software receives the HTML text, dynamic data, URL address of static content, and the like from customer web server 40. Similar to above, the URL address is passed (220) to client DNS (LDNS) 170 for resolution, step 500. In this example, in response, client DNS 170 passes (230) the URL address to NameServer server (ADNS) 110, step 510.

In the present embodiment, NameServer server 110 uses the service metrics information associated with the other POP servers that was determined in step 400, to select an appropriate POP server that includes the static content, step 520. In this example, NameServer server 110 determines that the west coast POP server 10 is very heavily loaded with content requests, but the east coast POP server 30 has a lighter load with fewer content requests. Thus, in response to the user's request, NameServer server 110 determines that the user should retrieve data from POP server 30. NameServer server 110 then recalls the IP address of POP server 40, step 530, and then sends the IP address to the user, step 540.

Next, user 150 receives the IP address of POP server 30, and then sends requests (250) for the static content from POP server 30, step 550. In response to the request, POP server 30 routes the request to WebCache server 280. Next, WebCache server 280 retrieves the static content from memory, and sends the requested static content back to user 150, step 560.

In an important embodiment of the present invention, the customer's web server may also be considered for providing the static content. In such an embodiment, in step 520, above, the latency and traffic load information for the customer web server may be considered at the same time as the other POP servers. If the customer's web server is lightly loaded compared to the POP servers, the IP of the customer's web server may be retrieved in step 530, and passed to the user in step 540. Accordingly, in step 560, the customer's web server provides the static content back to the user.

Once the client receives the static content, the user can view the HTML text and dynamic data from customer web server 40, as well as view the static content from POP server 30, step 570. In one embodiment, the source of the static content may be specified as being provided at a specific server or a limited set of servers.

Figure 4:
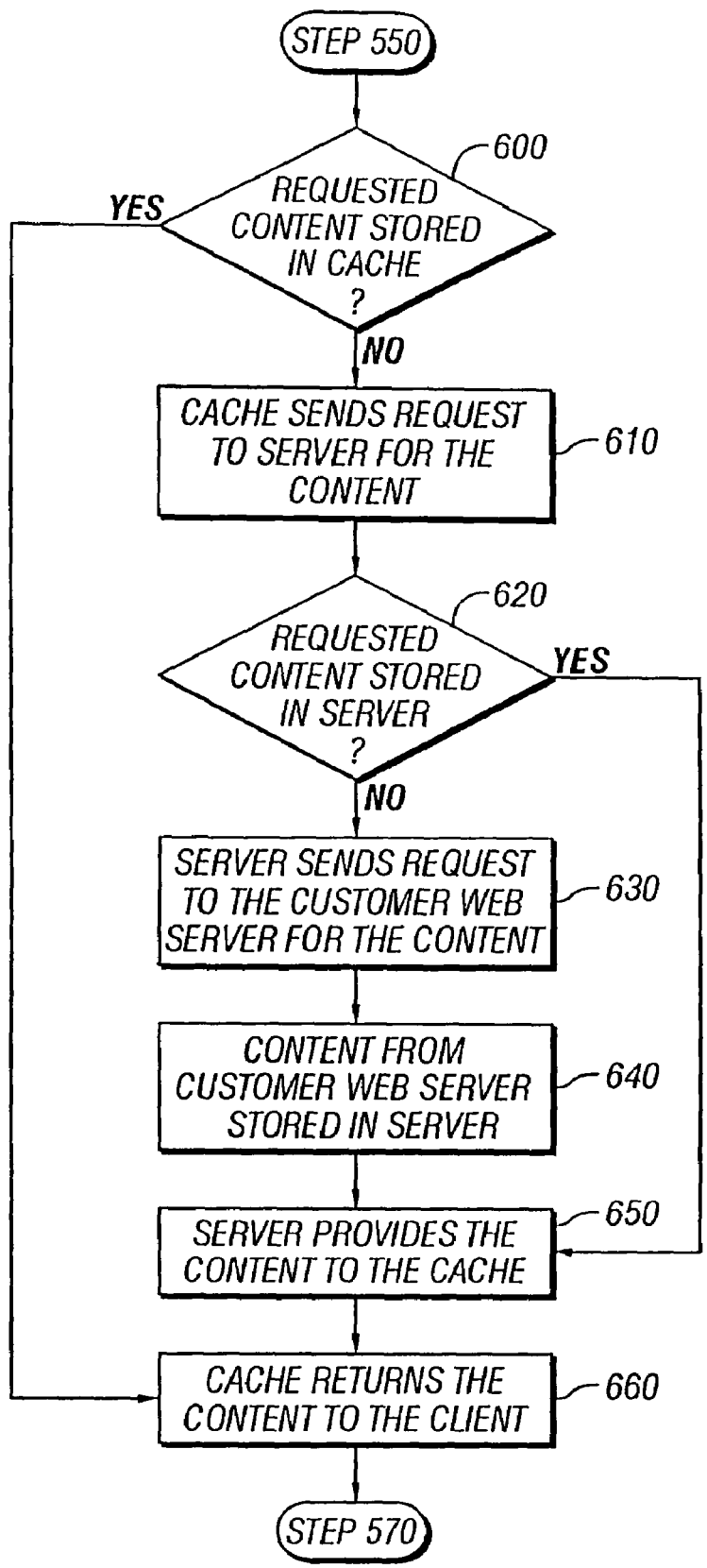
FIG. 4 illustrates a flow chart according to another embodiment of the present invention.

FIG. 4 illustrates a flow chart according to another embodiment of the present invention. In particular, FIG. 4 illustrates a more detailed block diagram of step 560, above.

Initially, WebCache server 280 determines whether it has the requested static content in memory, step 600. In one embodiment of the present invention, this step may include determining whether the file requested is resident in memory. If the requested static content is not cached within WebCache server 280, WebCache server 280 sends a request (260) for the static content to WebServer server 290, step 610.

In response, WebServer server 290 determines whether it has the requested static content on disk, or the like, 620. In one embodiment of the present invention, this step may include determining whether the file requested is resident in on a disk or database. If the requested static content is not stored within WebServer server 290, WebServer server 290 determines sends a request (270) for the static content to a customer web server, step 630.

In embodiments of the present invention, the appropriate customer web server selected is also determined based upon the traffic load and latency of the multiple customer web servers to POP server 30. As an example, since POP server 30 is on the east coast and close to customer web server 40. As a result, the request for the static content is directed to customer web server 40. In an alternative embodiment, the customer web server from which static content is retrieved is predetermined.

In this example, customer web server 40 provides the static content to WebServer server 290, which in turn stores the static content to disk, or the like, step 640.

Once the data is stored within WebServer server 290, the static content is copied into the memory of WebCache server 280, step 650. Next, WebCache server 280 returns the static content to the user, step 660.

Figure 5:
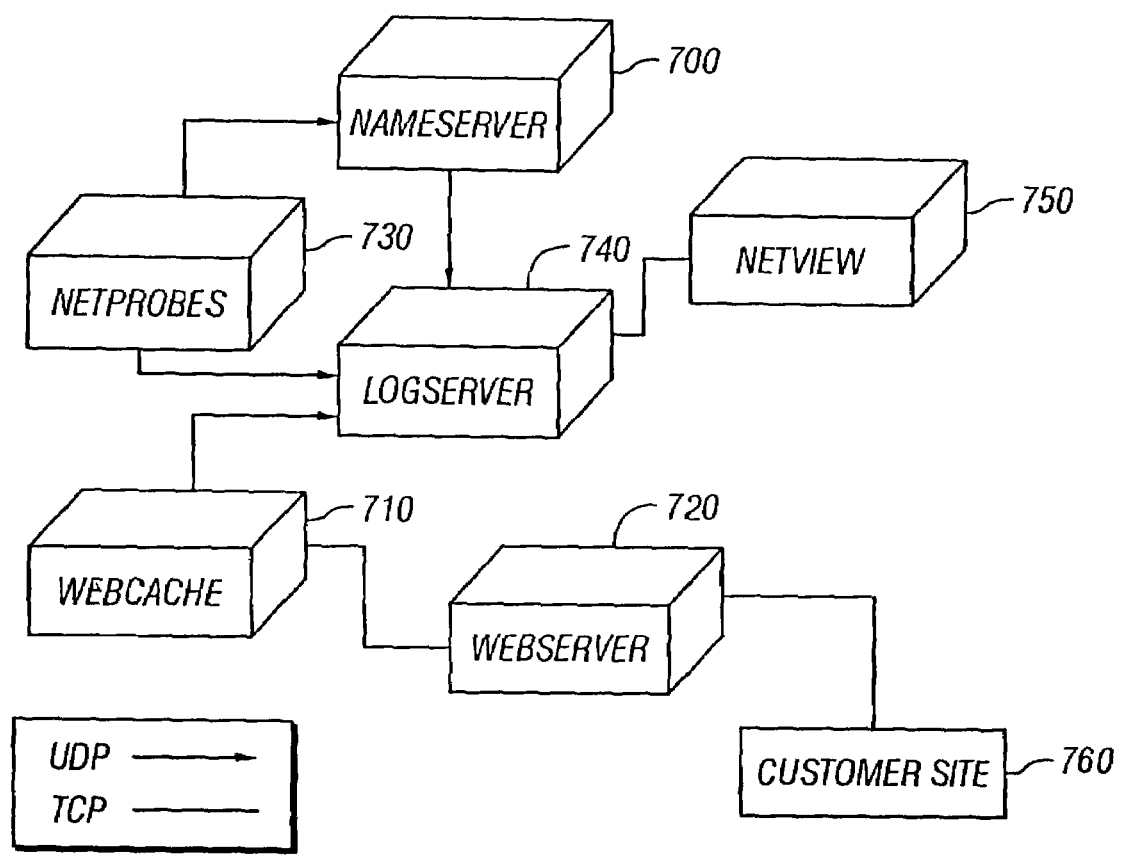
FIG. 5 illustrates a more detailed block diagram according to one embodiment.

FIG. 5 illustrates a more detailed block diagram according to one embodiment. In particular, FIG. 5 illustrates are more detailed description of the flow of data between software components on the POP network.

FIG. 5 includes a reduced number of software components on servers on the POP network, including a NameServer server 700, a WebCache server 710, a WebServer server 720, NetProbes 730, LogServer server 740, and NetView server 750. As illustrated, in the present embodiment, communication between the components is performed using a packetized format such as TCP, UDP, or the like. FIG. 5 also illustrates a customer web site 760.

In the present embodiment, the configuration of the POP network is maintained in a single global configuration file. This file is known as the "global configuration" file. In this example, every POP server in the POP network determines configuration information by the copy of the current Speedera configuration file stored locally.

In this embodiment, the configuration file includes a list of servers allowed to change the configuration; a list of domains the network is responsible for (i.e. customers' web sites); list of software components and services available in each POP server; a list of probes that perform latency checks at each POP server; and the like. Other similar types of information are also included.

In the present example, a new configuration file can be pushed to all POP servers by using the AdminTools software, mentioned above.

The configuration file in the present embodiment, is in a "registry tree" type format. Typically few statistics, status or extended information is kept in the configuration file. Such data is typically stored in server 740, as will be described below. In the present example, the configuration file is kept small to reduce the amount of time required for updating a configuration file across the POP network. Further, a tree-type format is used to allow the configuration to be easily extended without having to change its structure.

In this embodiment, the configuration file is not necessarily sent to all POP servers in the POP network. Instead, only POP servers including NameServers, NetProbes and LogServers are updated. In the present embodiment, POP servers only including a WebCache or a WebServers are not updated, because WebCache and WebServers access NameServers to find services on the POP network. For example, when a WebCache needs to send information to a log server, it will make a request to: "log.name.speedera.com." In response, a request is generated to a NameServer and in response the NameServer returns the appropriate IP address. Because the configuration file does not need to be sent out to all the POP servers in the network, any configuration file update is performed efficiently.

With this configuration file scheme, to install a new POP server, an administrator uses the AdminTools software tools, to register the unique domain name and the services or software components installed on the new POP server. These data are added to the configuration file. Subsequently, the configuration file is copied across the POP network.

In the present embodiment, as mentioned above, the domain name uniquely identifies the POP server. In one example, the name is "name.pop.speedera.net", "dp1.westusa.speedera.net", or the like.

As mentioned above, the NameServer software is embodied as a DNS server that performs name to IP address mapping. In particular, the software receives requests containing textual names and returns numeric IP addresses typically in the form of xxx.xxx.xxx.xxx, associated with those names. In the present embodiment, the software is also responsible for receiving and storing latency, POP server status information, and the like from the NetProbe servers. Other types of data includes the source IP address, the availability of the POP server, the traffic load, and the like are also stored.

In the present embodiment, approximately 10 servers including the NameServer software will operate on the POP network. Typically, the NameServer software is installed onto its own machine to increase the performance of the software. In one embodiment, the DNS servers should be designed to handle upwards of 1000 hits per second.

It is contemplated that the 10 DNS servers will handle all the DNS requests for all users on the Internet that are serviced by the POP network. For example, users that require the POP network to determine the least loaded customer web site, and users that require content stored on the POP network both require services from the DNS servers. In alternative embodiments, a greater number of lesser number of DNS servers may be used according to specific application.

In this embodiment, in operation, the NameServer replies to DNS queries and does not return any other information. Specifically, to generate a reply to a DNS query, the DNS server may uses the following information: the configuration file to determine what machines have the content corresponding to the request; a table containing latency information for each POP to each client DNS (traffic load); a table containing service metrics (load/availability) information for each POP server, and the like.

In this embodiment, the data received from NetProbe servers comprise UDP traffic. Further the NameServer software transmits log information to the LogServer software, also via UDP traffic. In other embodiments, other schemes for transferring packetized data is contemplated.

The NameServer receives the service and latency information data from the NetProbe servers. In addition, in this embodiment, timestamp is also received so the Name Server software knows how stale the performance information is. The NameServer software stores this information to disk, to RAM, or the like. In this embodiment, the NameServer data is typically stored on disk to reduce the effects of a crash or a reboot. In this way, the latency and probe information is maintained. Further, in some cases, data such as persistence information, should be maintained even if the system is rebooted.

In this embodiment, the NameServers log the requests they get and the replies they give, i.e. IP addresses. In operation, at regular intervals (specified by the global configuration file), the NameServer sends its latest statistics (e.g. number of hits it has taken per domain name, etc.) to the various NetProbe servers and appropriate log analysis servers via UDP. In the global configuration file, log analysis servers are assigned based on the domain name served. In the present embodiment, the log analysis is a distributed process.

In the present embodiment, the DNS software is proprietary and supports all features of BIND.

The WebCache software is typically embodied as a caching web server. As described above, the WebCache server accepts HTTP or URL requests and checks memory for the requested content. As discussed in the flow diagram above, the content is typically static content from a customer's web page, or the like. If the content is not in the memory, the WebCache server contacts a WebServer server that may have the web page stored using HTTP.

In one embodiment, WebCache is a customized caching server. In other embodiments, WebCache may include hardware cache boxes available from companies such as CacheFlow, Inktomi, or the like.

In this example, at a regular fixed intervals, the WebCache server compresses and sends the logs of the content it stores, and sends the logs to log analysis servers. This transfer is typically via UDP traffic. This information provided by the WebCache server is typically used for billing purpose as well as by customers for auditing and log analysis. In the case where a hardware cache box is used, the box must also be configured to send the logs to the log analysis servers.

In the present embodiment, the WebCache software is proprietary but could be integrated with off the shelf caching products.

In the present embodiment, when a WebCache server cannot provide the content requested, it forwards the request to a server running WebServer software it believes has the content. As discussed above, the WebServer software processes the request by looking on its local disk for the content. If the content exists on the local disk, the WebServer will pass the data to the WebCache. Further, if the content in not on the disk, the WebServer contacts the customers web site to retrieve the content.

In this embodiment, the WebServer typically does not provide log data. Instead, the WebCache provides the cache miss information to the log analysis servers. WebServer, along with many of the other software modules do report error conditions to the log server.

In the present embodiment, the WebServer and WebCache may exist as one program. In alternative embodiments, these pieces of software may be separate and even reside on different machines.

The NetProbes software performs service availability/metric and latency probes and sends the results via UDP to NameServer servers. There are two distinct types of probes in the present embodiment, service probes and latency probes.

In this example, service probes determine service availability and load (metrics) for each content delivery machine in the network. Content delivery machines includes the POP servers including WebCache and WebServer modules, and may also include the customer's web site(s). Service probes monitor data such as HTTP total response time, FTP total response time, and the like.

In the present embodiment, service probes run constantly, and send current metric and availability information to all DNS servers in the POP network. The timing of the probe intervals and configuration of the service probes is typically speechified in the global configuration file.

Latency probes determine latency from the POP server hosting the NetProbe to the client DNS servers that sent the requests to Speedera DNS servers. The Speedera DNS servers typically drive the latency probes. In particular, when a DNS server determines that it needs latency information from a probe, it sends a request to the probe. In response, the latency probe probes the client DNS server and returns with the result. In one embodiment, the DNS servers send a number of requests in a single UDP packet to a latency probe.

The NetProbe servers typically do not store the results of the probes, but simply sends them to other servers via UDP. Each piece of probe information has a timestamp of when the probe occurred so the receiving server can determine how stale the probe information is.

In the present embodiment, LogServer servers receives data from machines running NameServer, NetProbes and WebCache software. The data is typically transmitted to one or more log analysis servers where the data is stored and analyzed. As mentioned above, the data is typically stored by customer name to facilitate billing and preparation of audit and historical statistics. Additionally, The LogServer software also gets requests for information from the NetView software. Such a request may be made when an administrator, or the like wants to graphically view or view the table of data for current or historical status of a web site (hits, open connections, etc.).

The configuration file will have a list of log servers and the customer domains they manage, however, LogServers will only receive data for the customer domains they manage, not for other domains.

The NetView software referred to above is typically an HTML user-interface providing customers and administrators to use a web browser to view real-time and historical information. The NetView software includes a web server and CGI or web server plug-in modules written in Perl or C.

In operation, NetView servers contact LogServers or the LogServer database to get the underlying data. The raw data from LogServers and formats and displays it to customers, or the like in the form of tables and/or graphs.

The NetView software also provides an interface that allows a customer to flush content from the POP network when they publish new content to their servers. To perform the action of flushing content, the NetView software executes the AdminTool software that has the ability to flush content from the system.

In the present embodiment, the AdminTools software includes tools used to administer the Speedera Network. It contains two main tools, one to push a new configuration file to servers in the network and another to cause content to be flushed from the network.

The configuration administration tool sends the global configuration file to servers in the network in a hierarchical fashion. A list of servers will get the configuration file and send it to another list of servers and so on. The list of servers to receive the configuration file and what servers they control is typically specified by the configuration file itself.

In this embodiment, the configuration system is written such that it does not allow configuration files to get out of sync, when machines are down or if a socket connection breaks while transmission is in process, or the like. For example, in one embodiment, the administration tool opens sockets to all the master configuration servers, sends the configuration file and waits for confirmation that they and everyone they send the file to receives it and then send a command to tell everyone to switch to use that configuration file.

In this embodiment, the configuration administration tool uses TCP and not UDP because of the increased security. Additionally, password protection and encryption may also be used.

The Shared software includes software that will exist on all servers in the network. This includes a configuration daemon that listens for the transmission of a new configuration file, stores it locally and sends a SIGHUP to local processes to notify them the configuration has changed.

In the foregoing specification, the invention has been described with reference to specific exemplary embodiments thereof. Many changes or modifications are readily envisioned. For example, in some embodiments, steps 460 and 470 are not explicitly performed. Instead, after the DNS server resolves the IP address of the customer web server in step 450, the IP address is automatically used to address the customer web server. Similarly, in some embodiments, steps 540 and 550 are not explicitly performed. Instead, after the DNS server resolves the IP address of the POP server in step 530, the IP address is automatically used to address the POP server. Details of additional embodiments of the present invention may be found in the documents in the attached appendix.

In embodiments of the present invention, the static content stored on the web caches may include movies, audio, images, text, plug-in program data, programs, and the like. Other types of data can be stored within the web caches, for example, streaming audio data, video data, and the like.

Further, the embodiments have discussed providing data across wide area networks, such as the Internet. In other embodiments, embodiments of the above described invention may be applied to other types of networks including wireless networks, local area networks, and the like.

The block diagrams of the architecture and flow charts are grouped for ease of understanding. However it should be understood that combinations of blocks, additions of new blocks, re-arrangement of blocks, and the like are contemplated in alternative embodiments of the present invention. Further, the above names of servers, software modules, and the like are arbitrary, and may be changed.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A machine implemented method, comprising:
    sending a Web page resident on a customer Web server to a requesting user, the Web page including static content represented by an embedded URL;
    wherein the static content is served by a plurality of Web caches within a POP server network;
    wherein the customer is a customer of a service that operates the plurality of Web caches;
    wherein the customer pays a fee to the service for use of the plurality of Web caches storing static content for the customer;
    determining service metrics of the plurality of Web caches;
    selecting a Web cache from the plurality of Web caches, the Web cache having service metrics more appropriate for a user request from the Web page than service metrics of other Web caches in the plurality of Web caches; and
    sending the user request for the static content to the Web cache.

2. The method of claim 1, wherein the sending step further comprises:
    determining traffic loads of a plurality of customer Web servers using a probe server;
    selecting the customer Web server from the plurality of customer Web servers using a DNS server, the customer Web server having a traffic load more appropriate for a user request than traffic loads of other customer Web servers in the plurality of customer Web servers; and
    sending the user request for the Web page to the customer web server.

3. The method of claim 2, wherein the traffic loads include latency measurements between the probe server and the plurality of customer Web servers.

4. The method of claim 2, wherein the determining traffic loads step measures traffic loads at predetermined intervals.

5. The method of claim 1,
    wherein the determining service metrics step uses a probe server to determine service metrics of the plurality of Web caches;
    wherein the selecting a Web cache step uses a DNS server to select the Web cache from the plurality of Web caches; and
    wherein the Web cache sends the static content to the requesting user.

6. The method of claim 5, wherein the service metrics include metrics selected from: HTTP response time, FTP response time, CPU load, memory load.

7. The method of claim 5, wherein the determining service metrics step determines service metrics at predetermined intervals.

8. The method of claim 5, further comprising:
    determining whether the requested static content is resident on the Web cache;
    determining a customer Web server that has the requested static content when the requested static content is not resident on the Web cache;
    wherein the Web cache retrieves the requested static content from the customer Web server; and
    storing the requested static content from the customer Web server on the Web cache.

9. The method of claim 8, wherein the customer Web server from which static content is retrieved is predetermined.

10. The method of claim 1, wherein the network of POP servers comprises more than one DNS server.

11. A method, comprising:
    sending a Web page resident on a customer Web server to a requesting user, the Web page including cacheable content represented by an embedded URL and dynamic content represented by a second embedded URL;
    wherein the dynamic content is served by a plurality of customer Web servers;
    wherein the cacheable content is served by a plurality of Web caches within a POP server network;
    wherein the customer is a customer of a service that operates the plurality of Web caches;
    wherein the customer pays a fee to the service for use of the plurality of Web caches storing static content for the customer;

determining service metrics of the plurality of Web caches;

selecting a Web cache from the plurality of Web caches, the Web cache having service metrics more appropriate for a user request from the Web page than service metrics of other Web caches in the plurality of Web caches; and sending the user request for the static content to the Web cache.

12. The method of claim 11, wherein the sending step further comprises:

determining traffic loads of the plurality of customer Web servers using a probe server;

selecting the customer Web server from the plurality of customer Web servers using a DNS server, the customer Web server having a traffic load more appropriate for a user request than traffic loads of other customer Web servers in the plurality of customer Web servers; and sending the user request for the Web page to the customer web server.

13. The method of claim 12, wherein the traffic loads include latency measurements between the probe server and the plurality of customer Web servers.

14. The method of claim 12, wherein the determining traffic loads step measures traffic loads at predetermined intervals.

15. The method of claim 11, wherein the determining service metrics step uses a probe server to determine service metrics of the plurality of Web caches;

wherein the selecting a Web cache step uses a DNS server to select the Web cache from the plurality of Web caches; and wherein the Web cache sends the static content to the requesting user.

16. The method of claim 15, wherein the service metrics include metrics selected from: HTTP response time, FTP response time, CPU load, memory load.

17. The method of claim 15, wherein the determining service metrics step determines service metrics at predetermined intervals.

18. The method of claim 15, further comprising;

determining whether the requested static content is resident on the Web cache;

determining a customer Web server that has the requested static content when the requested static content is not resident on the Web cache;

wherein the Web cache retrieves the requested static content from the customer Web server; and storing the requested static content from the customer Web server on the Web cache.

19. The method of claim 18, wherein the customer Web server from which static content is retrieved is predetermined.

20. The method of claim 11, wherein the network of POP servers comprises more than one DNS server.

21. An apparatus, comprising:

a module for sending a Web page resident on a customer Web server to a requesting user, the Web page including static content represented by an embedded URL;

wherein the static content is served by a plurality of Web caches within a POP server network;

wherein the customer is a customer of a service that operates the plurality of Web caches;

wherein the customer pays a fee to the service for use of the plurality of Web caches storing static content for the customer;

a module for determining service metrics of the plurality of Web caches;

a module for selecting a Web cache from the plurality of Web caches, the Web cache having service metrics more appropriate for a user request from the Web page than service metrics of other Web caches in the plurality of Web caches; and a module for sending the user request for the static content to the Web cache.

22. The apparatus of claim 21, wherein the sending module further comprises:

a module for determining traffic loads of a plurality of customer Web servers using a probe server, a module for selecting the customer Web server from the plurality of customer Web servers using a DNS server, the customer Web server having a traffic load more appropriate for a user request than traffic loads of other customer Web servers in the plurality of customer Web servers; and a module for sending the user request for the Web page to the customer web server.

23. The apparatus of claim 22, wherein the traffic loads include latency measurements between the probe server and the plurality of customer Web servers.

24. The apparatus of claim 22, wherein the determining traffic loads module measures traffic loads at predetermined intervals.

25. The apparatus of claim 21, wherein the module for determining service metrics uses a probe server to determine service metrics of the plurality of Web caches;

wherein the module for selecting a Web cache uses a DNS server to select the Web cache from the plurality of Web caches; and wherein the Web cache sends the static content to the requesting user.

26. The apparatus of claim 25, wherein the service metrics include metrics selected from: HTTP response time, FTP response time, CPU load, memory load.

27. The apparatus of claim 25, wherein the determining service metrics module determines service metrics at predetermined intervals.

28. The apparatus of claim 25, further comprising:

a module for determining whether the requested static content is resident on the Web cache;

a module for determining a customer Web server that has the requested static content when the requested static content is not resident on the Web cache;

wherein the Web cache retrieves the requested static content from the customer Web server; and a module for storing the requested static content from the customer Web server on the Web cache.

29. The apparatus of claim 28, wherein the customer Web server from which static content is retrieved is predetermined.

30. The apparatus of claim 21, wherein the network of POP servers comprises more than one DNS server.

31. An apparatus, comprising:

a module for sending a Web page resident on a customer Web server to a requesting user, the Web page including cacheable content represented by an embedded URL and dynamic content represented by a second embedded URL;

wherein the dynamic content is served by a plurality of customer Web servers;

wherein the cacheable content is served by a plurality of Web caches within a POP server network;

wherein the customer is a customer of a service that operates the plurality of Web caches;

wherein the customer pays a fee to the service for use of the plurality of Web caches storing static content for the customer;

a module for determining service metrics of the plurality of Web caches;

a module for selecting a Web cache from the plurality of Web caches, the Web cache having service metrics more appropriate for a user request from the Web page than service metrics of other Web caches in the plurality of Web caches; and a module for sending the user request for the static content to the Web cache.

32. The apparatus of claim 31, wherein the sending module further comprises:

a module for determining traffic loads of the plurality of customer Web servers using a probe server;

a module for selecting the customer Web server from the plurality of customer Web servers using a DNS server, the customer Web server having a traffic load more appropriate for a user request than traffic loads of other customer Web servers in the plurality of customer Web servers; and a module for sending the user request for the Web page to the customer web server.

33. The apparatus of claim 32, wherein the traffic loads include latency measurements between the probe server and the plurality of customer Web servers.

34. The apparatus of claim 32, wherein the determining traffic loads module measures traffic loads at predetermined intervals.

35. The apparatus of claim 31, wherein the module for determining service metrics uses a probe server to determine service metrics of the plurality of Web caches;

wherein the module for selecting a Web cache uses a DNS server to select the Web cache from the Plurality of Web caches; and wherein the Web cache sends the static content to the requesting user.

36. The apparatus of claim 35, wherein the service metrics include metrics selected from: HTTP response time, FTP response time, CPU load, memory load.

37. The apparatus of claim 35, wherein the determining service metrics module determines service metrics at predetermined intervals.

38. The apparatus of claim 35, further comprising:

a module for determining whether the requested static content is resident on the Web cache;

a module for determining a customer Web server that has the requested static content when the requested static content is not resident on the Web cache;

wherein the Web cache retrieves the requested static content from the customer Web server; and a module for storing the requested static content from the customer Web server on the Web cache.

39. The apparatus of claim 38, wherein the customer Web server from which static content is retrieved is predetermined.

40. The apparatus of claim 31, wherein the network of POP servers comprises more than one DNS server.

* * * * *